United States Patent [19]

Pothier

[11] Patent Number: 4,969,043

[45] Date of Patent: Nov. 6, 1990

[54] IMAGE-CONVOLUTION AND ENHANCEMENT APPARATUS

[75] Inventor: Robert G. Pothier, Amherst, N.H.

[73] Assignee: Lockheed Sanders, Inc., Nashua, N.H.

[21] Appl. No.: 430,718

[22] Filed: Nov. 2, 1989

[51] Int. Cl.[5] ........................ H04N 3/14; H04N 5/335

[52] U.S. Cl. .......................... 358/213.27; 358/213.15; 358/213.28; 358/37

[58] Field of Search ............ 358/209, 37, 166, 213.27, 358/213.28, 43, 44, 213.15

[56] References Cited

U.S. PATENT DOCUMENTS

| | | | |
|---|---|---|---|
| 4,663,661 | 5/1987 | Weldy et al. | 358/44 |
| 4,720,745 | 1/1988 | DeForest et al. | 358/37 |
| 4,720,871 | 1/1988 | Chambers | 358/37 |
| 4,774,592 | 9/1988 | Suzuki et al. | 358/213.28 |

OTHER PUBLICATIONS

Gregory A. Baxes, "Digital Image Processing—A Practical Primer", Prentice-Hall, Inc., pp. 47–64, published 1984.

*Primary Examiner*—James J. Groody
*Assistant Examiner*—W. Clements
*Attorney, Agent, or Firm*—Robert G. Crooks

[57] ABSTRACT

This is an apparatus for sharpening and otherwise enhancing images such as those produced on a screen or on the face plate of a cathode-ray tube. Regarding an image as being composed of a very large number of elements called "pixels," the apparatus of this invention enhances those of the pixels which appear at points of rapid transition between light and shade in the image. The apparatus comprises a plurality of substrates superimposed upon one another, optically in series. A first such substrate includes an array of filters and lenses which together form a "mask" that operates upon selected portions of the light input thereto to multiply certain portions of the light input with respect to certain other portions of the light input. The light upon which this operation has taken place proceeds to a second substrate where it is detected to generate electrical signals expressive of the intensities of the respective portions of the light input. The detectors cooperate with the filters and lenses of the first substrate to accomplish the aforementioned multiplication and may process the light in accordance with a so-called Laplacian distribution. The lenses of the first substrate may be three-dimensional lenses called "negative lenses." Alternatively, they may be two-dimensional devices called Fresnel zone-plate elements, one such zone plate for each of the aforementioned pixels. In a variation of the invention, the first substrate and the second or detecting substrate may be disposed close to the face plate of a cathode-ray tube. Light is conducted from the face plate to the first substrate by means of fiber optics. The image of the cathode-ray tube is thus enhanced and may be re-displayed directly or may be conveyed to a remote location by summing the detected outputs from the second or detecting substrate and transmitting the summed outputs to a remote display unit.

16 Claims, 3 Drawing Sheets

CONVOLUTION PROCESS FOR ONE-KERNEL DETECTOR PAIR

IMAGE-CONVOLUTION AND ENHANCEMENT APPARATUS

This invention relates to apparatus for processing images in real time in a small physical volume. The invention is especially useful in the enhancement of images by sharpening their edges and all other portions of the images where a well-defined transition of shading should appear.

BACKGROUND OF THE INVENTION

In the art of electro-optics, it is common to regard an image as composed of a large number of points of light of intensity and shade ranging from black to white and passing through all shades of gray. Each point of light can be imagined as square in cross section and is often referred to as a "pixel". An image is then formed of many lines arranged in the form of a so-called "raster", each line of the raster in turn comprising an array of many pixels. A common size of raster has 512 lines, each line in turn containing 512 pixels, disposed so that the edges of each pixel abut adjacent pixels on all four sides, except at the outer edges of the raster. The visual effect of the image depends upon the relative brightnesses of the respective pixels. Since it is relative brightness of the pixels that creates the image, the rate of change of brightness in going from one pixel to any of its neighbors in the raster is important. It will be understood that this important rate of change is measured with respect to distance across the image rather than with respect to time. Therefore, it is called a "spatial rate of change".

According to communications theory, an electrical or other signal representing a quantity which is changing rapidly must itself have components which are high in frequency. The more rapid the rate of change of the quantity being represented, the higher must be the frequency of the electrical or other signal representing the quantity. On the other hand, if the spatial rate of change of brightness or other quantity being represented is low, the electrical or other signal representing the quantity will have components of much lower frequency. Hence, the signal representing an image comprises many different frequency components, ranging from high to low. If the transitions between the brightnesses of adjacent pixels in an image are very rapid, it is said that the spatial frequency is high.

The foregoing relationship between spatial rate of change of image-pixel brightness and the frequencies of the signal representing the image has led to a concept known as "spatial filtering". Along with spatial filtering, the prior art includes a concept called "spatial convolution". Convolution is a complex mathematical operation used in signal analysis. In the field of optical images composed of pixels, convolution makes possible the calculation of the spatial rates of change of brightness on each of the four sides of a square pixel. For the purpose of making such a calculation, we may scan an array of pixels forming an image, and arbitrarily select for consideration a particular group of pixels, sometimes called a "kernel". Typically, a kernel may comprise nine pixels arrayed in three lines each having three pixels. Thus, we may consider a hypothetical "central pixel" and its relationship with the eight pixels which surround it. The spatial rates of change of brightness in going from the central pixel to each of its eight neighbors are a measure of the frequency components which will be necessary in the electrical or other signal representing the image. It will be understood that a kernel might comprise a larger number of pixels, e.g. twenty-five (five lines of five pixels each).

In electronics, a circuit for performing differentiation, or measuring rate of change, commonly comprises the combination of a series capacitor and a parallel resistor. It happens that this combination of a series capacitor and a parallel resistor can also act as a high-pass filter because it allows the through-passage of high-frequency components while suppressing low-frequency components. By analogy, in the optical art of spatial filtering, a high-pass optical filter performs the function of differentiating or measuring the spatial rate of change of brightness at the transition between adjacent pixels of an image.

According to the prior art, it is possible to operate on the image of a kernel of nine, or some other number of, selected pixels while applying different weighting to the signals representing the respective pixels of the kernel. Thus, the image of the nine-pixel kernel is transmitted in a modified form in which the central pixel is weighted much more heavily than the surrounding pixels of the kernel. By analogy to the mathematical operation of convolution, these weighting factors may be referred to as "convolution coefficients". In optical apparatus, the convolution coefficients may be embodied in a transmission filter called a "convolution mask". The mask therefore produces a modified image in which the brightness of the central pixel of each kernel is a large multiple of the brightness of its neighboring pixels. In constructing such a filter, one may employ an optical high-pass mask in which the portion of the mask corresponding to the central pixel produces a multiplication by 8 or 9, whereas the portions of the mask corresponding to the neighboring pixels produce a multiplication by −1. This type of optical mask is referred to as a "Laplacia mask" and can accomplish edge enhancement of an image in which various kernels of pixels are similarly analyzed.

The prior art as described in the foregoing paragraphs is well summarized in a publication entitled *Digital Image Processing, A Practical Primer* by Gregory A. Baxes, published by Prentice-Hall, Inc. in 1984. However, the prior art suffers from a number of deficiencies One such deficiency results from taking a sequential approach to the analysis of the various kernels of nine or more pixels in the image to be analyzed and enhanced. In an image displayed on a raster having 512 lines of 512 pixels each, as previously described, it would be necessary to analyze each arbitrary kernel, one at a time, in order to produce an improved image with edge enhancement. Disregarding the edges, it would be necessary to process each of 512 times 512 or 262,144 possible kernels individually in order to produce the improved image with enhanced edge definition. If this operation were accomplished by using high-pass spatial filtering and the aforementioned convolution technique in the digital electronic domain, the time required for the complete processing of the image would be of the order of seconds.

For example, it is sometimes necessary in military electronics to recognize and define a target by optoelectronic means. To maximize the accuracy of fire-control target acquisition, it may also be necessary to enhance the edges of the image of the target. As aforementioned, this could be done in accordance with the prior art by regarding each of the 262,144 pixels of the 512 by 512-pixel raster as the center of a kernel and by digitizing the brightness of each of the nine pixels of each such kernel individually. Then, by electronic techniques, the signals representing the brightnesses of the various pixels of each of the kernels cOuld be multiplied by passing them through a Laplacian- coefficient matrix in which the multiplier of the central pixel is a factor of 8 or 9 while the multipliers of the surrounding pixels are factors of −1. The products of the nine multiplications for each kernel could then be added together to obtain a single value which would represent the enhanced brightness of the central pixel. Having repeated this operation more than 200,000 times, one could arrive at an edge-enhanced image, but the image might well be too late to be of any value for its intended purpose.

OBJECTS OF THE INVENTION

In view of the deficiencies of the prior-art methods of achieving an edge-enhanced image, it is an object of my invention to provide a new technique for enhancing an optical image within a very short period of time, consistent with the requirements of today's civilian and military operations.

It is another object of my invention to provide apparatus for convolving and enhancing an optical image in a very small amount of physical space and at low cost.

It is a further object of my invention to accomplish edge enhancement of an image without the necessity for digitizing the brightness or intensity of each of thousands of multi-pixel kernels of the image.

SUMMARY OF THE INVENTION

Briefly, I have fulfilled the above-mentioned and other objects of my invention by providing an optoelectronic apparatus having a plurality of layers or substrates, in which at least the first substrate is an analog optical substrate including components such as negative or Fresnel zone-plate lenses in an array. The first substrate may also include an array of spatially specific optical filters. A second substrate connected optically in series with the aforementioned substrate receives from the first substrate light flux which has been selectively weighted or multiplied according to Laplacian or similar techniques, and which is then detected to generate an electrical signal which is then processed to impart desired polarities to its various components, and then combined or summed for immediate display or for transmission to a remote display.

In the first or analog optical substrate, I provide an array of lenses which effectively multiply, by a substantial factor, the light flux from the central portion of the central pixel of each kernel, while concurrently multiplying by a much lesser factor or by a negative factor the light from surrounding pixels of each kernel. This is accomplished by minimally refracting or by transmitting directly the light from the central portion of the central pixel while significantly refracting the light from surrounding pixels of the kernel so as to form a conical beam of light. The conical beam of light is then detected by light-sensitive electronic components in a second substrate, whereupon their respective outputs are combined with predetermined relative polarities. For example, the electrical output of a detector for the central, minimally refracted light flux is inverted, or given an opposite polarity before being combined in summing circuitry with the electrical outputs generated by detectors of the significantly refracted conical beam of light. Inasmuch as this multiplying and summing operation can proceed simultaneously in each of the 262,144 (less 2044) possible kernels of a 512 by 512 raster, the desired convolution and edge-enhancement operation can be completed in a time period limited only by the responsiveness of the associated electronic circuits. Typically this is much less than one microsecond.

The lenses employed in the first or analog optical substrate may be "positive" or "negative" lenses, or Fresnel zone-plate lenses. If the latter are chosen, they may be planar in configuration. Thus the thickness of the first substrate can be minimized. The detectors in the second substrate may also be very thin. Still further, the amount of space required for the through-passage of the minimally refracted light flux and the conical beam of light is not very great. Therefore, the total thickness and volume of the apparatus can be kept to a minimum in accordance with one of the objects of my invention.

Inasmuch as the Fresnel zone-plate lenses for use in the first substrate may be formed by an inexpensive process of photolithography, the cost of the image-convolution and enhancement apparatus may also be minimized in accordance with another object of my invention.

BRIEF DESCRIPTION OF THE DRAWINGS

The invention summarized above will be described in detail in the following specification. The specification will be best understood if read while referring to the accompanying drawings, in which:

In FIG. 3, the convolution- optics substrate includes a "negative lens" for each pixel of the kernel;

DESCRIPTION OF PREFERRED EMBODIMENTS

Figure 1:
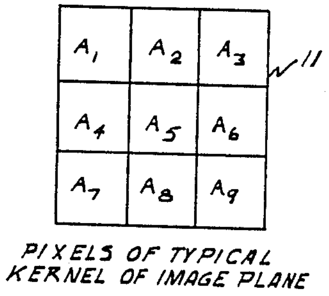
FIG. 1 is a diagrammatic representation of a typical kernel of an image which is to be enhanced. This kernel is arbitrarily defined as having nine pixels arranged in three rows of three each.

Turning to FIG. 1 of the drawings, we find a representation of a typical kernel 11 of nine pixels, which could be located at any position on a screen or other device for displaying an image. The kernel is arbitrarily defined as having a central pixel which is designated "$A_5$", surrounded by eight other pixels having the designations $A_1$ through $A_4$ and $A_6$ through $A_9$. The selection of a kernel having nine pixels is advantageous because, assuming the square shape of each pixel, motion from central pixel $A_5$ leads across a "border" into another pixel, no matter which direction is chosen from central pixel $A_5$. Thus, the spatial rate of change of brightness in going from pixel $A_5$ to any one of its surrounding neighbors is a measure of the frequency of the signal which must be generated in order to represent the transition of brightness from pixel $A_5$ to such neighboring pixel.

Figure 2:
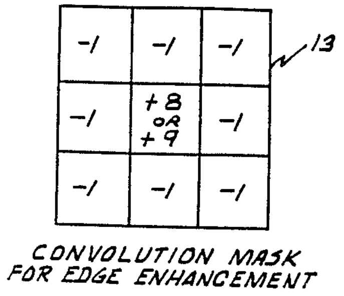
FIG. 2 shows the convolution coefficients of a mask for enhancing the image kernel shown in FIG. 1 and having a central pixel denominated as "$A_5$" in FIG. 1.

FIG. 2 shows the convolution coefficients of a convolution mask 13 suitable for superposition over kernel 11 of FIG. 1 in order to enhance it by a process of convolution. The mask could be a transparency of suitable plastic film, shaded in accordance with a code so that each square element of the mask functions as a "multiplier" or processor for light flux impinging thereon from the respective pixels of kernel 11 of FIG. 1. The convolution coefficients of FIG. 2 may be regarded as a numerical representation of a combination of functions illustrated in the cross-sectional FIG. 3 of the drawings. The function of convolution mask 13 is embodied in the convolution-optics substrate, the convolution-detection substrate, and the electronic circuits illustrated in FIG. 3.

Figure 3:
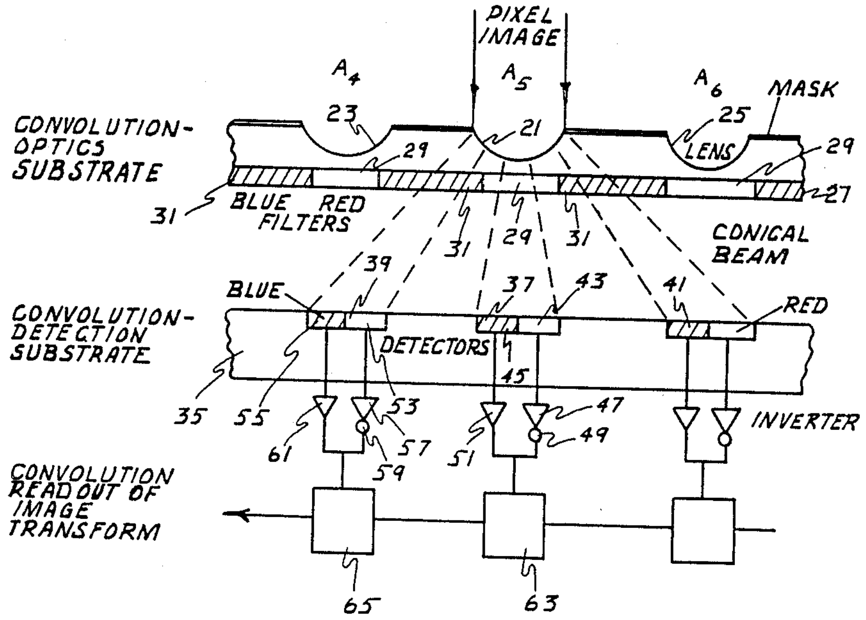
FIG. 3 is a cross-sectional representation of the image-convolution and enhancement apparatus in accordance with my invention, including a convolution-optics substrate, a convolution-detection substrate, and circuitry for summing and reading out signals expressive of the convolved image.

The cross section of FIG. 3 is taken through the physical structure of the convolution-optics substrate and the convolution-detection substrate and also through pixels $A_4$, $A_5$, and $A_6$ of FIG. 1. Once again, pixel $A_5$ is the central pixel of the kernel chosen for illustrative purposes. Of course, the cross section of FIG. 3 does not intersect pixels $A_1$ through $A_3$ or pixels $A_7$ through $A_9$.

In the cross-sectional view of FIG. 3, pixel $A_5$ could be any pixel of the raster image except a pixel at the extreme edge of such image. The light flux from pixel $A_5$ is directed into a first negative lens 21 which is juxtaposed with pixel $A_5$ so that the central portion of the light flux from pixel $A_5$ strikes the central portion of first negative lens 21 and passes therethrough without substantial refraction. It will be understood that a "negative lens" is defined as a lens which is concave rather than convex in configuration. The light flux from the outer portions or edges of pixel $A_5$ impinges upon the outer portion or edge of first negative lens 21 and is refracted significantly by virtue of its impingement upon the outer portion of the hollow concavity of first negative lens 21.

There is a slight separation between the plane in which the image pixels are formed and the plane of the convolution-optics substrate in which first negative lens 21 is formed. Accordingly, some of the light flux impinging upon the edges of first negative lens 21 derives from the eight pixels of the kernel other than pixel $A_5$. Since that light flux comes from a ring of what might be called "outer pixels" surrounding central pixel $A_5$, the significantly refracted light flux emerging from first negative lens 21 takes the form of a cone. Thus, the effect of first negative lens 21 is to pass through, without significant refraction, the light flux impinging thereon from the central portion of pixel $A_5$ of the image kernel, while refracting into the form of a conical beam the light flux coming to first negative lens 21 from the outer portions of pixel $A_5$ and from all pixels surrounding central pixel $A_5$ in the image plane.

Although we have arbitrarily selected pixel $A_5$ as the central pixel of the kernel which we have chosen for purposes of illustration, it will be understood that pixel $A_4$, or pixel $A_6$, or any of the other pixels $A_1$ through $A_9$, or for that matter any other pixel in the entire displayed image (except only an edge pixel) could be arbitrarily chosen as the central pixel for purposes of illustration. For instance, pixel $A_4$ could be chosen as the central pixel of another arbitrary kernel in which pixel $A_5$ would then be one of the outer pixels of that kernel rather than the central pixel. In that event, light flux impinging upon the central portion of a second negative lens 23 would pass through second negative lens 23 without substantial refraction, while light flux impinging upon the outer portions of second negative lens 23 from the outer portions of pixel $A_4$ or from pixels surrounding pixel $A_4$ would be substantially refracted and would form a conical beam similar to that which was formed by first negative lens 21 from the light flux impinging thereon from the outer portions of pixel $A_5$ and from pixels surrounding pixel $A_5$. Still further, a similar process of through-passage and of selective significant refraction takes place at a third negative lens 25, shown in FIG. 3 spaced from first negative lens 21 remotely from second negative lens 23. Third negative lens 25 is optically juxtaposed with pixel $A_6$ of the image to be enhanced. Third negative lens 25 cooperates with pixel $A_6$ of the image in a manner similar to that in which second negative lens 23 cooperates with pixel $A_4$ of the image. The aforementioned negative lenses are recessed in the surface of a sheet of transparent material such as clear plastic, and may be physically formed by etching the clear plastic material or by a laser melting process.

In close proximity to negative lenses 21 through 25, just described, the convolution-optics substrate of FIG. 3 includes a spectral filter plane 27 disposed parallel to the plane in which the aforementioned negative lenses are formed. Spectral filter plane 27 comprises certain portions which favor through-passage of light flux of one particular color, and certain other portions which favor through-passage of light flux of another particular color. For instance, spectral filter plane 27 may comprise red portions 29 and blue portions 31. For each negative lens, spectral filter plane 27 is so arranged that light flux passing directly through without substantial refraction by the negative lens will impinge upon a red portion 29, whereas light flux significantly refracted by the negative lens and formed into the aforementioned conical beam will impinge upon the blue portions 31 of spectral filter plane 27. Spectral filter plane 27 may be constructed of a suitable plastic film material on which red and blue pigments have been deposited through a mask. Spectral filter plane 27 may be adhered to the surface of the material in which negative lenses 21 through 25 are formed, and on the opposite surface from said negative lenses.

Spaced a short distance from the just-described convolution-optics substrate is the convolution-detection substrate of my invention, also illustrated in FIG. 3 of the drawings. The convolution-detection substrate includes a first flat supporting member 35 having thereon detector pairs 37, 39, and 41, all arranged in a common plane on the surface of flat supporting member 35. Detector pair 37 is disposed on the optical axis of negative lens 21, so that light flux impinges upon detector pair 37 after passing through one of the red portions 29 of spectral filter plane 27 without having undergone significant refraction. Thus, strong red light impinges on detector pair 37, but very little if any blue light or light of any color except red impinges upon detector pair 37 from pixel $A_5$ of the image to be enhanced. Detector pair 37 comprises two detector elements 43 and 45 respectively. Detector element 43 responds electrically to red light, whereas detector element 45 responds to blue light. Inasmuch as very little blue light from pixel $A_5$ impinges upon detector pair 37, the output of that detector pair in response to pixel $A_5$ comes almost entirely from detector element 43, which responds to red light. The electrical output of detector element 43 is then passed through a pre-amplifier 47 and an inverter 49.

It has been explained in the foregoing paragraph that the light flux impinging upon detector pair 37 and derived from pixel $A_5$ is principally red in color. Accordingly, there is little electrical signal output from blue detector element 45 resulting from the aforementioned light flux derived from pixel $A_5$. However, any electrical signal output from blue detector element 45 passes through a pre-amplifier 51, the output of which is then combined with the inverted output of pre-amplifier 47 as shown schematically in FIG. 3. This combining of signals constitutes the addition function in the convolution equation to be set forth below.

Assuming intense red light flux from the central portion of pixel $A_5$ impinging upon red detector element 43 of detector pair 37, followed by pre-amplification in pre amplifier 47, it becomes apparent how the multiplication factor or convolution coefficient of +8 or +9, illustrated in FIG. 2 of the drawings, is achieved in accordance with my invention. Furthermore, inverter 49 imparts to that strong amplified signal the polarity required by the convolution coefficient.

Whereas a strong signal is derived from the light flux impinging upon detector pair 37 from the central portion of pixel $A_5$, the corresponding signal produced by blue detector element 45 and passed through pre-amplifier 51 is weak or non-existent. Hence, the combination of the two signals strongly favors a positive convolution coefficient in response to the central portion of pixel $A_5$. However, it will be recalled that detector pair 37, located on the optical axis of first negative lens 21, is so positioned as to receive light flux from the conical beams developed by second and third negative lenses 23 and 25 respectively. In other words, although detector pair 37 is on the optical axis of first negative lens 21 and is a principal detector for light flux from the central portion of pixel $A_5$, detector pair 37 is also a "fringe detector" for light flux from second negative lens 23 and third negative lens 25, as well as for the respective negative lenses which are located in juxtaposition with all of pixels $A_1$ through $A_9$ (except pixel $A_5$) of the kernel which we have chosen for illustrative purposes. Light flux from the central portion of pixel $A_4$ passes through second negative lens 23 substantially without refraction and in turn passes through a red portion 29 of spectral filter plane 27 and impinges on detector pair 39 where it evokes an electrical response from a red detector element 53 but not from a blue detector element 55. Once again, the output of red detector element 53 is passed through a pre-amplifier 57 and an inverter 59, thereby furnishing a principal electrical signal contribution resulting from the functioning of detector pair 39.

While the principal electrical signal resulting from the passage of light flux from the central portion of pixel $A_4$ through the central portion of second negative lens 23 has just been described, it must be remembered that the light flux impinging upon the outer portions of second negative lens 23 is refracted significantly to form a conical beam in a manner similar to the formation of the conical beam by first negative lens 21 resulting from light flux impinging thereon from the outer portions of pixel $A_5$. The conical beam of light formed by second negative lens 23 passes through the blue portions of spectral filter plane 27 and impinges on the respective detectors corresponding to all eight of the pixels surrounding pixel $A_4$, including detector pair 37, which corresponds to pixel $A_5$. Thus, blue detector element 45 of detector pair 37 will respond to blue light flux reaching it through the medium of the conical beam formed by second negative lens 23. In a similar manner, blue detector element 45 of detector pair 37 receives blue light flux through the blue portion of spectral filter plane 27 from the conical beam formed by third negative lens 25, which is juxtaposed with pixel $A_6$. Accordingly, the blue detector element of each of the detector pairs mounted on first flat supporting member 35 receives a small contribution from the conical beam formed by each of the pixels surrounding it. In sum, the strong signal output from inverter 59 is combined with a signal component resulting from the impingement of eight conical beams of light upon blue detector element 55 of detector pair 39, and in turn is pre-amplified by a pre-amplifier 61.

The combined signal resulting from direct light-flux throughput from pixel $A_5$ and indirect, or significantly refracted, light flux from the pixels surrounding pixel $A_5$ goes to a convolution readout device 63, which may be a charge-coupled device or any other suitable electronic circuit for sampling and holding available the signals reaching it from the combined output of the detectors. A similar convolution readout device 65 accepts and holds available the combined signal outputs resulting from pixel $A_4$ and from its eight contiguous neighbors. By known electronic techniques, the contents of each of the convolution readout devices such as 63 and 65 and the other similar devices in that line of the raster can be swept via charge coupling to the end of the line and in turn routed for display elsewhere or placed in memory.

The convolution operation which has just been described in words can be summarized mathematically by the following equation:

$$-A_1-A_2-A_3-A_4+9A_5-A_6-A_7-A_8-A_9=\text{-}$$

the convolution for pixel $A_5$.

Figure 4:
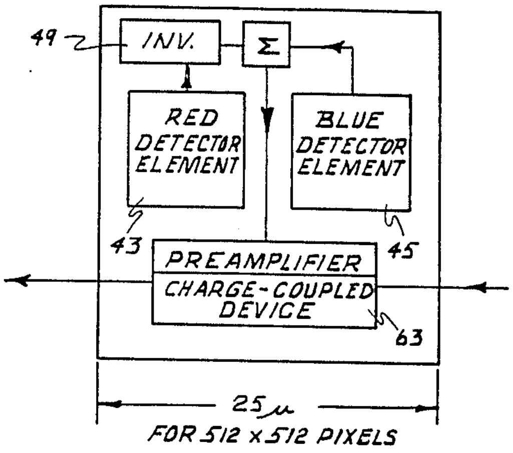
FIG. 4 is a representation of one possible package of electronic circuitry for performing the detection and readout function of the signal corresponding to one pixel of the image to be enhanced.

A portion of the electronic circuitry for implementing the mathematical function of the foregoing equation is illustrated in FIG. 4 of the drawings. The figure shows schematically a semiconductor cell embodying the functions that have been described in the portion of the specification relating to FIG. 3 of the drawings. In FIG. 4, the electrical signal output of red detector element 43 is inverted as to polarity by inverter 49 before being summed or combined with the electrical signal output of blue detector element 45. The combined signal output then goes to a convolution readout device 63, which may comprise a pre-amplifier and a charge-coupled device. Thus, in FIG. 4, the pre-amplification function is performed on the combined signal rather than on the output of individual detector elements, as shown in the configuration of FIG. 3. It will be understood that these two arrangements are equivalent, and both are effective in the practice of my invention.

Figure 5:
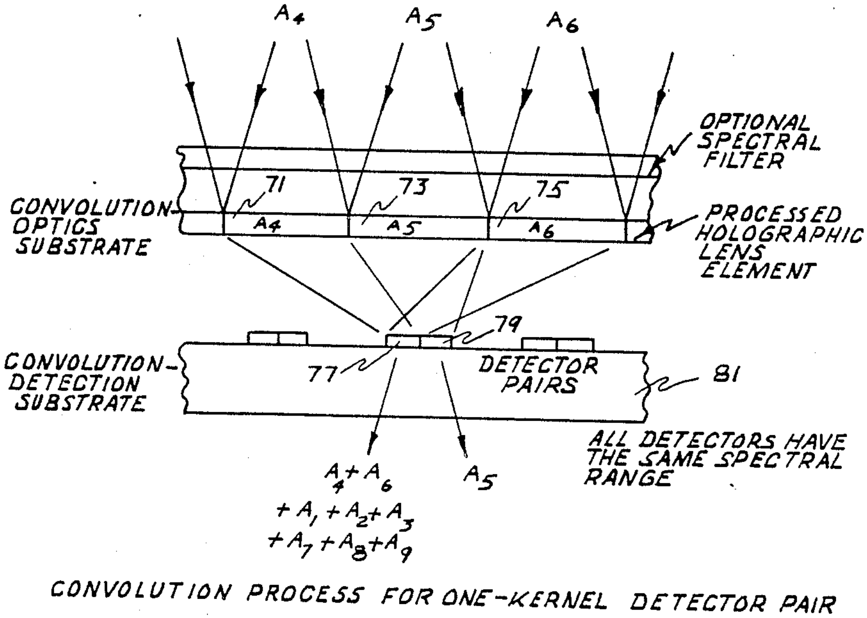
FIG. 5 is a cross-sectional diagram of another embodiment of my invention in which the convolution-optics substrate employs processed holographic lens elements rather than negative lenses.
Figure 6:
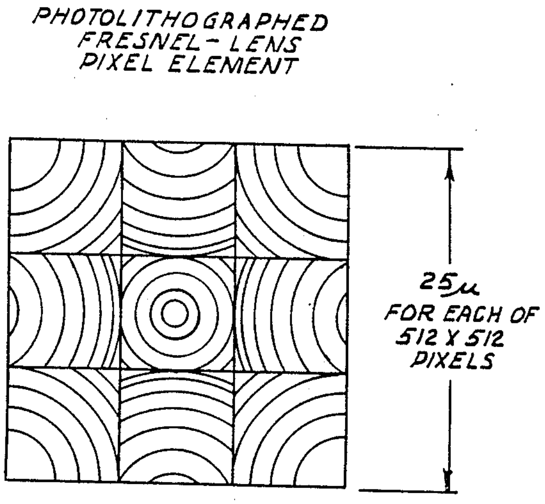
FIG. 6 illustrates one possible type of processed holographic lens element, specifically a photolithographed Fresnel zone-plate lens of appropriate size and shape to process light flux from any of the pixels of an image such as would be formed on a raster of 512 by 512 pixels.

In the foregoing discussion of the configurations of FIG. 3 and FIG. 4 of the drawings, the interaction between light flux emanating from representative pixels of the image and the various detectors on which that light flux impinges has been explained. In the configuration of FIG. 3, spectral filter plane 27 performs the polarity portion of the multiplication or "weighting" function required by the equation set forth above. In that mode of operation, colored light flux, having passed through spectral filter plane 27, impinges upon both red and blue detector elements of the respective detector pairs corresponding to the pixel from which the light flux emanated and to its neighboring pixels. In the configuration of FIG. 3, no attempt is made to focus the light flux on a particular detector element of each detector pair. The color discrimination is performed by spectral filter plane 27. In an alternative approach, which allows elimination of the spectral filter plane if desired, the light is more narrowly focused upon desired elements of each detector plane. Thus, a convolution process similar but not identical to that of FIG. 3 is illustrated in FIG. 5. In the apparatus of FIG. 5, the convolution-optics substrate employs processed holographic lens elements rather than the negative lenses illustrated in FIG. 3. Each of those processed holographic lens elements may, if desired, be a Fresnel zone-plate lens element such as is illustrated in FIG. 6 of the drawings. FIG. 6 shows a Fresnel zone-plate lens element designed to correspond to one pixel of the image. For instance, if the raster on which the image is displayed comprises 512 lines of 512 pixels each, the Fresnel zone-plate lens element shown in FIG. 6 would be approximately 25 micrometers on each of its four sides. The Fresnel zone-plate lens element can be formed by a photo-lithographic process in which nine suitable portions are defined in order to focus the light flux from the central portion of the central pixel while suitably refracting the light flux from the outer portions of the central pixel and from its neighboring pixels.

In the configuration of FIG. 5 of the drawings, the convolution-optics substrate comprises an array of Fresnel zone-plate lens elements, such as those shown in FIG. 6. For purposes of illustration, FIG. 5 depicts a first Fresnel zone-plate element 71 juxtaposed with pixel $A_4$ of the image, a second Fresnel zone-plate element 73 juxtaposed with pixel $A_5$ of the image, and a third Fresnel zone-plate element 75 juxtaposed with pixel element $A_6$ of the image. If a spectral filter is employed, comparable to spectral filter plane 27 shown in FIG. 3 of the drawings, the detector elements may be color-sensitive detector elements such as red detector element 43 and blue detector element 45 of FIG. 3. However, if one chooses to depend upon the specific refractive capabilities of the Fresnel zone-plate lens elements, the detector elements need not be color-sensitive, but should respond only to the intensity of the light flux impinging thereon. Assuming that one chooses to operate without a spectral filter, and to rely instead upon the specific refractive capabilities of the Fresnel zone-plate lens, then in place of the color-sensitive detectors such as were illustrated in FIG. 3, we have pairs of detector elements each having the same spectral range. For purposes of illustration and discussion, we shall refer to a first detector element 77 and a second detector element 79 as shown in FIG. 5. The refractive specificity of the second Fresnel zone-plate lens element 73, corresponding to pixel $A_5$, is such that light flux impinging thereon from pixel $A_5$ is minimally refracted and principally impinges upon second detector element 79. By contrast, the light flux impinging upon first Fresnel zone-plate lens element 71 and on third Fresnel zone-plate lens element 75 is significantly refracted so as to form beams which impinge principally upon first detector element 77. It will be understood that first detector element 77 and second detector element 79 are components of a detector pair similar to other pairs which are arrayed, one pair for each pixel of the image, upon the convolution-detection substrate of the apparatus. The detector pairs comprising the convolution-detection substrate may be supported by a second flat supporting member 81. As illustrated in FIG. 5, the signal output from second detector element 79 is a measure of the brightness of image pixel $A_5$, by virtue of the specific and selective refraction by the Fresnel zone-plate lens element. On the other hand, the signal output from first detector element 77 is a measure of the combined light flux derived after significant refraction from all the pixels of the kernel except pixel $A_5$. Of course, pixel $A_5$ simply represents the arbitrarily chosen central pixel of an arbitrarily chosen kernel of the image. Thus, in the configuration of FIG. 5, the definition of the convolution coefficients results from the design of the Fresnel zone-plate lens elements rather than from the spectral filter. The convolution coefficients may also be defined by selective deposition or etching of light-attenuating materials on the convolution-optics substrate.

Figure 7:
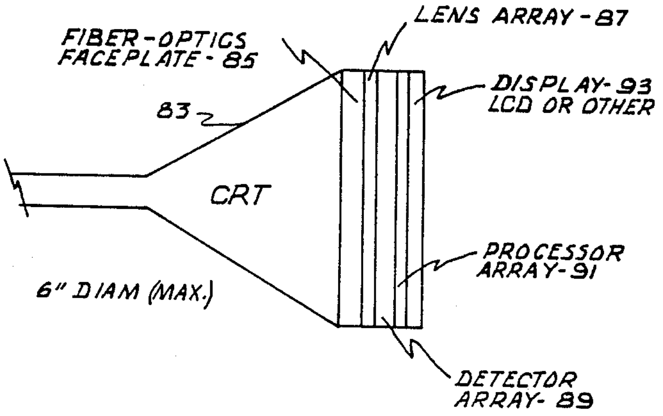
FIG. 7 is a representation of an assembly comprising a cathode-ray tube having a fiber-optics face plate, and an image-convolution and enhancement apparatus in accordance with my invention, arranged to display immediately in front of the aforementioned face plate an enhanced version of the image appearing on that face plate.

In describing the configurations of FIGS. 3 and 5 of the drawings, the tacit assumption has been made that the detector signal outputs are summed, read out, and transported elsewhere to generate a remote image which is an enhanced version of the original image, composed of the pixels to which we have referred. An alternative approach to image enhancement is illustrated in FIG. 7 of the drawings, wherein is shown a cathode-ray tube 83 having a fiber-optics face plate 85. Light flux produced by the phosphors of the cathode-ray tube is guided by fiber optics and may be amplified to produce an image composed of an array of pixels on the aforementioned face plate. In close proximity to fiber-optics face plate 85 is positioned an array of optical elements such as a lens array 87. Although it would be theoretically possible to use positive or negative lenses in array 87, I prefer to use processed holographic lens elements to constitute lens array 87, preferably one Fresnel zone-plate lens element for each pixel of the image on fiber-optics face plate 85. Once again, the Fresnel zone-plate lens element should comprise a square arrangement of portions for selective refraction of the light flux from central and neighboring pixels. In the configuration of FIG. 7, the light flux having passed through and been refracted by lens array 87 impinges upon a detector array 89 analogous to that which comprises the convolution-detection substrate in FIGS. 3 and 5. The output of detector array 89 is in turn amplified by a processor array 91 and fed to a display 93. Processor array 91 may, if desired, comprise an integrated wafer of known construction. While an integrated wafer may be chosen for screens smaller than six inches in diameter, a ceramic wafer may be employed for screen diameters greater than six inches. The amplified signal output of processor array 91 goes to display 93, which is the final "output" of the system. The type of arrangement illustrated in FIG. 7 is especially suitable for applications where space is very limited, e.g. in gunsighting devices. In such applications, display 93 may comprise liquid-crystal devices. In any event, whatever the mode of processing or of display, the final image displayed will be enhanced and its edges sharpened by the process of convolution.

While I have described the preferred embodiments of my invention in specific terms, other embodiments of my invention according to the following claims may occur to those skilled in the art of making image-enhancement devices and apparatus.

The foregoing description has been limited to three embodiments of this invention. It will be apparent, however, that variations and modifications may be made in the invention, with the attainment of some or all of the advantages thereof. Therefore, the appended claims cover all such variations and modifications as come within the true spirit and scope of my invention.

What is claimed as new and desired to be secured by Letters Patent of the United States is:

1. Apparatus for processing a light image regarded as being composed of a plurality of pixels each located at a different intersection of a grid of orthogonal lines, said apparatus comprising:

(a) an array of optical elements positioned to receive light flux from said image, a first one of said optical elements being positioned in close proximity to the central one of an arbitrary kernel of pixels to receive light flux principally from the central portion of said central pixel, a plurality of other optical elements being positioned around said first one of said optical elements and respectively in close proximity to a plurality of other pixels around said central pixel to receive light flux from respective ones of said plurality of other pixels and from the edges of said central pixel, each of said optical elements including means for intensifying light flux from said central portion of the pixel in closest proximity thereto relative to light flux from the edges of said pixel and from said other pixels, and for refracting said light flux from the edges of said pixel significantly more than light flux from said central portion of said pixel;

(b) an array of detector devices, a first one of said detector devices being positioned on the optical axis of said first one of said array of optical elements to receive light flux therefrom with minimal refraction and to receive significantly refracted light flux from optical elements positioned around said first one of said array of optical elements to generate a composite electrical signal expressive of the total light flux impinging thereon, the polarity of the signal component expressive of minimally refracted light flux being opposite to that of the signal component expressive of significantly refracted light flux; and (c) means for summing the respective electrical signals from said array of detector devices with due regard for the respective polarities of each of the aforementioned signal components from said first and from all other detector devices of said array.

2. Apparatus in accordance with claim 1 comprising a large number of arrays of optical elements, and a large number of arrays of detector devices, one such array of optical elements and one such array of detector devices for each image pixel, said arrays of optical elements overlapping each other and said arrays of detector devices also overlapping each other so that all but one of each array of optical elements are shared with another array and so that all but one of each array of detector devices are shared with another array.

3. Apparatus in accordance with claim 1 or claim 2 in which each of said optical elements is a negative lens.

4. Apparatus in accordance with claim 1 or claim 2 in which each of said optical elements is a Fresnel zone-plate lens.

5. Apparatus in accordance with claim 1 or claim 2 in which each detector device comprises two detector elements, one positioned to receive the aforementioned minimally refracted light flux and the other positioned to receive the aforementioned significantly refracted light flux, and one of said detector elements having means for inverting the polarity of its signal component.

6. Apparatus in accordance with claim 2 in which said summing means includes sample-and-hold circuits for receiving the composite electrical signals from the respective detector devices.

7. Apparatus in accordance with claim 6, further including a charge-coupled device for reading out the outputs of said sample-and-hold circuits.

8. Apparatus in accordance with claim 1 or claim 2, further including read-out and remote display means actuated by the output of said summing means.

9. Apparatus for developing and processing a light image regarded as being composed of a plurality of pixels, each located at a different intersection of a grid of orthogonal lines, said apparatus comprising:

(a) a cathode-ray tube having a fiber-optics face plate whereby light flux produced by the phosphors of the cathode-ray tube is guided by fiber-optics to provide an image composed of an array of pixels on said face plate;

(b) an array of optical elements positioned to receive light flux from said image, a first one of said optical elements being positioned in close proximity to the central one of an arbitrary kernel of pixels to receive light flux principally from the central portion of said central pixel, a plurality of other optical elements being positioned around said first one of said optical elements and respectively in close proximity to a plurality of other pixels around said central pixel to receive light flux from respective ones of said plurality of other pixels and from the edges of said central pixel, each of said optical elements including means for intensifying light flux from said central portion of the pixel in closest proximity thereto relative to light flux from the edges of said pixel and from said other pixels, and for refracting said light flux from the edges of said pixel significantly more than light flux from said central portion of said pixel;

(c) an array of detector devices, a first one of said detector devices being positioned on the optical axis of said first one of said array of optical elements to receive minimally refracted light flux therefrom and to receive significantly refracted light flux from optical elements positioned around said first one of said array of optical elements to generate a composite electrical signal expressive of the total light flux impinging thereon, the polarity of the signal component expressive of minimally refracted light flux being opposite to that of the signal component expressive of significantly refracted light flux;

(d) means for reading out and processing the electrical signals from said array of detector devices with due regard for the respective polarities of each of said signal components from said first and from all other detector devices of said array; and (e) display means responsive to said read-out and processing means for presenting an optically enhanced version of the image originally developed by the phosphors of said cathode-ray tube.

10. Apparatus in accordance with claim 9 in which said display means comprises an array of liquid-crystal elements.

11. Apparatus in accordance with claim 9 in which said read-out and processing means comprises an integrated wafer of semiconductor material.

12. Apparatus in accordance with claim 1 or claim 2 in which said array of optical elements includes a pixel-specific spectral filter disposed so as to favor the transmission of a certain wavelength band of light flux from the central one of each arbitrary kernel of pixels through said first one of said optical elements to said first one of said detector devices, positioned on the optical axis of said first one of said optical elements, while favoring the transmission of another certain wavelength band of light flux from said central one of said pixels to detector devices positioned around said first one of said detector devices and not on the optical axis of said first one of said optical elements.

13. Apparatus in accordance with claim 12 in which said optical elements include means for transmitting to said first one of said detector devices a substantially unrefracted beam of light flux from said central portion of said central pixel, while simultaneously transmitting from the edge portions of said central pixel to detector devices positioned around said first one of said detector devices a beam of light flux essentially in the form of a cone.

14. Apparatus in accordance with claim 13 in which each detector device comprises two detector elements, one detector element being responsive to light flux derived from an image pixel without significant refraction and the other detector element being responsive to a band of light flux derived from the edges of an image pixel and transmitted to said other detector element after experiencing significant refraction in passing through said optical elements.

15. Apparatus in accordance with claim 2 in which each of said detector devices includes two detector elements and in which means are provided for inverting the output signal of a first one of said detector elements before combining the inverted output signal with the output signal of a second one of said detector elements, said summing means including pre-amplifying means and a charge-coupled device for delivering to a bus the pre-amplified combination of the inverted output signal of said first detector element and the output signal of said second detector element.

16. Apparatus in accordance with claim 4 in which each Fresnel zone-plate lens comprises nine elements arranged in three rows of three elements each and in which the overall dimensions of each Fresnel zone-plate lens are similar to those of the image pixel to which it is most closely juxtaposed in said array of optical elements.

* * * * *